United States Patent [19]

Sutton et al.

[11] Patent Number: 5,978,505
[45] Date of Patent: Nov. 2, 1999

[54] SYSTEM AND METHOD FOR IMAGE REGULARIZATION IN INHOMOGENEOUS ENVIRONMENTS USING CLUSTERING IN NEURAL NETWORKS

[75] Inventors: Jeffrey P. Sutton, Brookline, Mass.; Ling Guan, Bexley North, Australia

[73] Assignees: Massachusetts General Hospital, Boston, Mass.; The University of Sydney, Sydney, Australia

[21] Appl. No.: 08/816,544

[22] Filed: Mar. 13, 1997

[51] Int. Cl.$^6$ .................................................. G06K 9/62
[52] U.S. Cl. ............................................ 382/156; 382/261
[58] Field of Search ................................... 382/156, 157, 382/158, 159, 225, 261

[56] References Cited

U.S. PATENT DOCUMENTS

| | | | |
|---|---|---|---|
| 5,014,327 | 5/1991 | Potter et al. | 382/14 |
| 5,274,714 | 12/1993 | Hutcheson et al. | 382/157 |
| 5,526,446 | 6/1996 | Adelson et al. | 382/275 |
| 5,733,721 | 3/1998 | Hemstreet et al. | 382/133 |

OTHER PUBLICATIONS

"Inhomogeneous Cellular Neural Networks: Possibility of Functional Device Design," Y. Andrevev et al., Institute of Radio Engineering and Electronics of Academy of Sciences, Jan. 1992 IEEE, pp. 135–140.
"An Active Vision System for a Location Task Using an Inhomogeneously Blurred Image," T. Yagi et al., Nagoya University and Chubu University, 1994 IEEE, pp. 4333–4336 No Month.
"Recognition and categorization in a structured neural network with attractor dynamics," C. Fassnacht et al., Institut fur Theoretische Physik der Universitat Gottingen, Network 2 (1991), pp. 63–84 No Month.
"A Partitioned Modified Hopfield Neural Network Algorithm for Real–Time Image Restoration," S.W. Perry et al., University of Sydney, J. of Real–Time Imaging, In Press May 1994.

"A Network of Networks Processing Model for Image Regularization," L. Guan et al., IEEE Transactions on Neural Networks, vol. 8 No. 1, Jan. 1997, pp. 1–7.
"Biologically Motivated Neural Computing in Early Vision Processing," L. Guan et al., Proc. IEEE SMC Conf. China, Nov. 1996, pp. 1–6.
"Image restoration by a neural network with hierarchical cluster architecture," L. Guan, University of Sydney, Journal of Electronic Imaging, vol. 3(2), Apr. 1994, pp. 154–163.
"Real–Time Image Filtering: From Optimal Neuron Evolution to Vector Quadratic Programming," L. Guan et al., University of Sydney, Apr. 1994 IEEE, pp. 694–699.
"Mean Field Theory of Nested Neural Clusters," J.P. Sutton, Proceedings Intern, AMSE Conference, Neural Networks, San Diego (USA), May 29–31, 1991, vol. 1, pp. 47–58.
"Hierachical Model of Memory and Memory Loss," Neural Computation in Wake and Sleep, App. B, J. P. Sutton et al., University of Toronto, J. Phys. A: Math. Gen. 21 Apr. (1988) pp. 4443–4454.
"Neural Models 1 : A Hierarchical Model of Neocortical Synaptic Organization," J.P. Sutton et al., University of Toronto, Mathl Comput Modeling, vol. 11, pp. 346–350, 1988, Printed in GB No Month.

*Primary Examiner*—Christopher S. Kelley
*Attorney, Agent, or Firm*—Wolf, Greenfield & Sacks, P.C.

[57] ABSTRACT

A regularization system and method for image restoration in homogeneous or inhomogeneous environments. The system and method includes features similar to a neural network with intermediate levels of structure including a pixel having processing capabilities; clusters consisting of a plurality of interconnected pixels and also having processing capabilities; and an image space comprised of a plurality of interconnected pixels and clusters and also having processing capabilities. The system and method also include means for assigning a regularization parameter to each pixel depending on the local variance of intensity of pixels; decomposing the image space into clusters of pixels, each cluster having the same regularization parameter; imposing a blurring function on each pixel; rapidly forming a regularized image by simultaneous local and global encoding of a regularization matrix onto each pixel directed through a process of gradient energy decent; and a means of assessing the output image.

20 Claims, 8 Drawing Sheets

SYSTEM AND METHOD FOR IMAGE REGULARIZATION IN INHOMOGENEOUS ENVIRONMENTS USING CLUSTERING IN NEURAL NETWORKS

FIELD OF THE INVENTION

The present invention generally relates to a neural network system and method for restoring or identifying ("regularizing") images or other sets of data. The system and method of the invention are particularly well suited for rapidly regularizing images or other sets of data that have been degraded by "inhomogeneous" distortion, meaning that the images or data have been non-uniformly distorted in space and/or time. The present invention is thus able to perform accurately in instances in which prior art inventions, capable of performing in an environment of homogenous noise, are not able to function accurately. In addition, the invention is able to operate on images or other sets of data distorted by inhomogeneous noise many times faster than other systems and methods for regularizing such images or other sets of data.

BACKGROUND OF THE INVENTION

"Neural networks" are so-called because they mimic in some key respects the activity and interconnectivity of neurons in the human brain. Artificial neural networks of the type to which the present invention belongs have the characteristic that they are able to "learn" through iterative processing during which the strengths of connections between artificial neurons are altered to reinforce associations between input and output patterns. In one class of such neural networks, regularization has been accomplished by "training" the network to respond with a specific output pattern when a particular input pattern (training pattern) is introduced. Because of its capability to associate a new input pattern with the training pattern "closest" to it by triggering the output pattern associated with the training pattern, neural networks of this class are able to regularize training patterns that have been distorted.

The nature of the distortion is often closely related, in the case of images, to the physical processes involved in the formation of the distorted image to be regularized and, more generally with respect to data sets, to the processes of collection, storage, or transmission. Typical examples of sources of distortion include limitations in the resolution of sensors, motion blur caused by relative movement between sensors and objects, refraction, poor focus, interference from external sources, turbid environments, loss of information during conversion between analog and digital representations, and loss of data during collection, storage, or transmission. Such distortion may make it difficult or impossible, without further processing to identify representative or even critical elements of the image or data.

Prior art neural networks, and other means such as serial statistical analysis, have been used to regularize images or other sets of data that have been distorted. The problem is difficult, however, since the data sets are often very large and optimization across multiple dimensions imposes severe computational burdens. Such extensive computation may not be practicable in many applications in which regularization must be achieved quickly. Moreover prior art systems and methods often are not capable of taking into account local correlations between signal and noise that could reduce the computational burden and increase the speed of regularization.

Even more fundamentally, such prior art often is constrained to operate in homogeneous noise environments; that is, where the data has been uniformly distorted in space and time or where special limitations on the nature of the noise, such as requirements of space-invariance or stationarity, have been imposed or assumed. If such prior art is applied to conditions of inhomogeneous noise, computational times may increase by thousands of times relative to the computational times achievable in homogeneous environments, or the regularization may not be achievable at all. Thus, such prior art is often not a practicable approach where the underlying image model is non-stationary, thereby introducing instabilities into the processed images, or where there are spatial inhomogeneities such as space-variant image functions or non-stationary noise statistics.

Attempts to achieve regularization in inhomogeneous environments have involved both serial statistical analysis and, alternatively, parallel distributed processing such as is embodied in typical neural network designs. Although parallel distributed processing employed in prior art neural network systems and methods has sometimes reduced the computational times involved, the designs of such systems or methods have characteristics that inherently limit the reduction of computational speed while maintaining accuracy. In particular, they contain modules that have parallel computational features but that are linked serially and subject to signal modulation or amplification that is specific for the particular problem being addressed.

Common applications of prior art neural networks and other methods for regularizing images or other sets of data include acoustic imaging, radar analysis, processing of images or other sets of data displayed in visual form, and restoring data that has been corrupted. As above noted, however, such prior art commonly requires either substantial knowledge of the characteristics of the source of the corruption of the image or data, or a source of such corruption that is essentially homogeneous, or both. Moreover, to the extent that such prior art is able to function in an environment of inhomogeneous distortion, identification or restoration of the image may require extensive computation that is not compatible with real-time or near-real-time operation.

Accordingly, it is a general object of the present invention to provide a system and method that overcome the drawbacks of prior art systems and methods, in particular by operating accurately and speedily in environments of inhomogeneous distortion, even if unknown.

SUMMARY OF THE INVENTION

In one embodiment of the invention, an analogy is drawn between attractor neural networks and a regularization network that can map distorted input images onto deblurred output images. The basic computational unit of the regularization network is a pixel which has analog properties. The pixels subdivide the image space into clusters. Clustering is determined by the variability among neighboring pixels and the implementation of a regularization matrix which is sensitive to inhomogeneities in the image. Weights are assigned to interconnected pixels and the dynamics utilize gradient decent to rapidly converge towards an acceptable regularized output. There are multiple avenues for feedback and tailoring to individual imaging problems. The strength of the invention is its ability to form intermediate levels of organization (i.e., clusters) which are sensitive to boundaries and edges and which focus computation at these boundaries and edges. The self-replicating architecture and adaptable nature of the cluster readily lends the invention to a variety of software and hardware implementations.

One embodiment of the invention is directed to a network of computational units including a first pixel having processing capabilities and the capability of assuming, an activity state. A first cluster, including a network of a plurality of interconnected pixels including the first pixel, also has processing capabilities. An image space including a network of interconnected clusters of interconnected pixels including the first cluster, also has processing capabilities. A mapping module maps an input image upon the image space. A variance-measuring module determines a variance of activity states of a plurality of pixels around the first pixel. A regularization module assigns a regularization parameter to the first pixel determined by the variance. A cluster-adjusting module changes the shape of the first cluster to include only a plurality of interconnected pixels, each pixel having a similar regularization parameter assigned to it.

In one embodiment of the invention, the network further includes a blurring module that applies a blurring function to the activity state of the first pixel.

In an embodiment of the invention, the network further includes a weight-assigning module that assigns a weight function to the first pixel as determined by the regularization parameter and the blurring function.

In an embodiment of the invention, the network further includes an intensity-adjusting module that adjusts the activity state of the first pixel.

Another embodiment of the invention is directed to a method for regularizing an input image distorted by noise. The method comprises the following steps: forming a first pixel having processing capabilities and capable of having an activity state; forming a first cluster including a network of a plurality of interconnected pixels including the first pixel, the first cluster also having processing capabilities; forming an image space including a network of interconnected clusters of interconnected pixels including the first cluster, the image space also having processing capabilities; mapping an input image upon the image space; determining a variance of activity states of a plurality of pixels around the first pixel; assigning a regularization parameter to the first pixel determined by the variance; and changing a shape of the first cluster to include only a plurality of interconnected pixels, each having a similar regularization parameter assigned to it.

In an embodiment of the invention, the method further comprises the following steps: determining a blurring function; determining a size of a blurring region over which the blurring function can be applied to the activity state of the first pixel; applying the blurring function to the activity state of the first pixel; determining a plurality of weight functions; assigning to the first pixel a weight function determined by the regularization parameter and the blurring function; calculating the weighted inputs to the first pixel; changing the activity state of the first pixel based on the weighted inputs; determining an energy change of the first pixel due to the change in the activity state; adjusting the activity state of the first pixel to decrease the energy; and repeating the forgoing steps unless adjusting the activity state of the first pixel does not decrease the energy.

DETAILED DESCRIPTION

The detailed description below should be read in conjunction with the accompanying figures in which like reference numerals indicate like structures and method steps. The simple examples included in the description are intended merely to be illustrative. The system and method described are intended to be applicable to complex commercial systems such as might be used for image regularization and a variety of other applications, including but not limited to data analysis and restoration, to which neural networks, serial statistical analysis, and other schemes have been applied.

The invention employs a novel system or method utilizing clustering within neural networks that may be implemented in software suitable for operation on currently available personal computers, workstations, or larger computers, or, alternatively, in hardware. It is applicable both where the possible set of underlying clear and undistorted images is finite and known, and where this information is not available. In addition to operating on images, the invention may readily be applied to other data sets subject to distortion by homogeneous or inhomogeneous noise. For convenience, all future references in this description will be to images or "image space," but the broader application is contemplated by such usage.

The invention is characterized by attributes of direct and substantial commercial importance. By way of illustration rather than limitation, these attributes include the ability rapidly to regularize distorted images or other data sets with performance unaffected by, and independent of, whether the source of distortion is homogeneous or inhomogeneous; the ability rapidly to adjust to inhomogeneities at a local level, i.e., between pixels, while maintaining rapid convergence globally, i.e., over the entire image space; and the ability to be readily and efficiently implemented in hardware due to its modular adaptable structures, vector computing, and sparseness of connections.

The invention thus provides a highly efficient computing platform with applications in diverse commercial areas involving image or other data-set regularization. The relative efficacy of the invention compared to prior art is particularly high in commercial applications likely to involve inhomogeneous distortion and a need for rapid regularization, such as medical imaging, acoustic imaging, radar imaging, and telecommunications. The attributes of the invention and its underlying architecture will now be described in greater detail, followed by a description of the steps that may be taken to realize an embodiment of the invention implemented by software or hardware.

The essence of one software or hardware embodiment of the invention applied in the context of inhomogeneous distortion (although the invention would perform as well in the environment of homogeneous distortion) can be summarized as follows. The basic processing elements, artificial neurons, are formed. These neurons then are interconnected in order to construct an "image space" upon which the non-regularized image may be mapped. The image space then is decomposed into local clusters and a regularization parameter is assigned to each cluster. A regularization matrix encodes the arrangement of clusters and is used in determining the weights among the neuron interconnectivities. The weights establish a mathematical relationship among the inhomogeneous image distortion, the clusters, the model network of neural clusters, and the dynamics of the clusters within the network of neural clusters. A crucial characteristic of the invention is that local clusters may expand, contract, or disappear in the course of the regularization process. As a consequence of this process, a regularized image is formed in a relatively small number of iterations of pixel processing by gradient energy decent.

A preferred embodiment of the invention will now be described more specifically in conjunction with a simple illustrative example with reference to the block diagrams depicted in FIGS. 1 through 10. This embodiment may be implemented in software or hardware.

Figure 1:
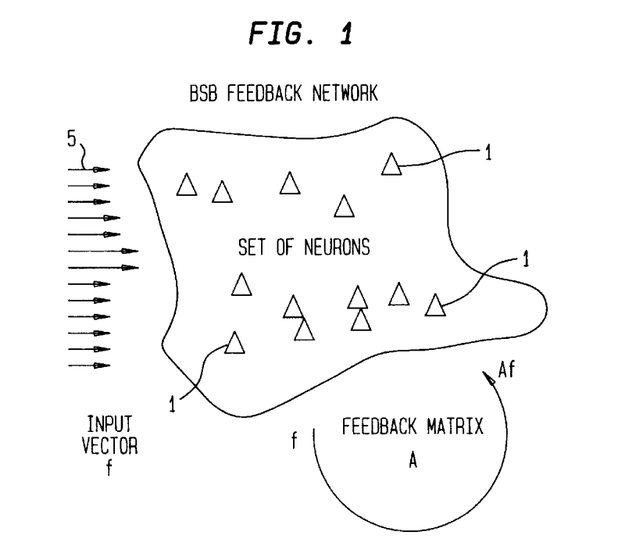
FIG. 1 is a graphical illustration of an exemplary type of artificial neuron and an exemplary interconnection of such neurons, the so-called BSB Feedback Network, that may constitute a framework for building an embodiment of the invention.

FIG. 1, which is prior art, is a representation of one kind of associative network, called a BSB Feedback Network, that maps mixed inputs, 5, onto individual outputs stored in the network. That is, the network associates an input pattern, 5, with a stored memory pattern. Individual computational units analogous to neurons are shown as triangles, such as the three triangles labeled 1 in FIG. 1, within a shaded area that constitutes a network of neurons. A description of the dynamics and characteristics of a BSB Feedback Network may be found in "The BSB Model: A Simple Nonlinear Autoassociative Neural Network," by James A. Anderson, in *Associative Neural Memories* by M. Hassoun (ed., Oxford Univ. Press, 1993), pp. 77–102, the contents of which are hereby incorporated by reference. It is not necessary for purposes of the present invention that the network be an associative network such as the one shown in FIG. 1. An important characteristic of the network for purposes of the present invention, however, is that the number of stable states or memory patterns that the network may obtain is a very small fraction of the possible number of such states. Moreover, the network must achieve stability through a non-linear process at a particular "attractor" state that may then be thought of as constituting the "memory" of that network.

Figure 2:
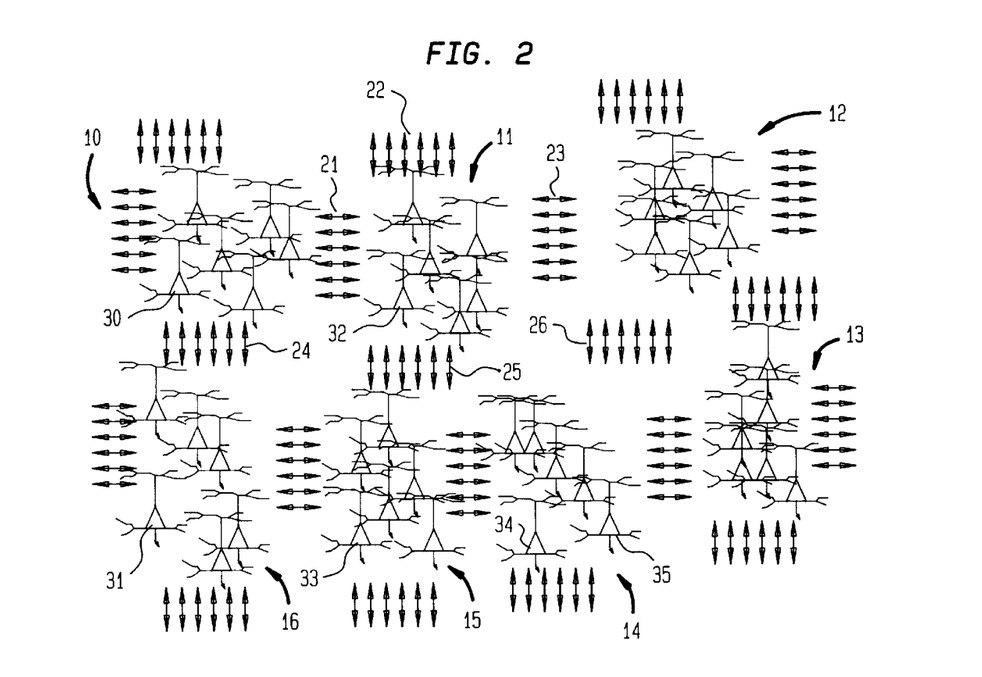
FIG. 2 is a graphical illustration of an exemplary design showing how neurons or pixels can cluster into small networks contained within a large network, such as the one shown in FIG. 1.

FIG. 2 illustrates clustering among neurons within a network such as of the type illustrated in FIG. 1. In the illustration of FIG. 2, there are seven clusters, 10–16, with representative connections, such as 20–26, between neurons in neighboring clusters. In such an architecture, the basic computational units, the artificial neurons, shown as triangles and including 30–35, form distributed networks (i.e., clusters) that themselves link to form a large network. In general, it is possible to construct many levels of neuron clustering. A key property is that neurons maintain their individuality as clusters are formed and become modified. Another key property is that the connections among neurons across cluster boundaries are represented by vectors, thereby allowing neurons within and between clusters to behave similarly. This is important since cluster boundaries typically change during processing.

In the embodiment of the invention, an image space is formed that is analogous to the formation of the neural network in FIG. 1. Whereas neurons are the basic computational unit in the neural network, individual pixels are the basic computational unit in the image space. The pixels are grouped together into clusters, whereby the boundaries for cluster formation are determined by the factors described in detail below.

Figure 3:
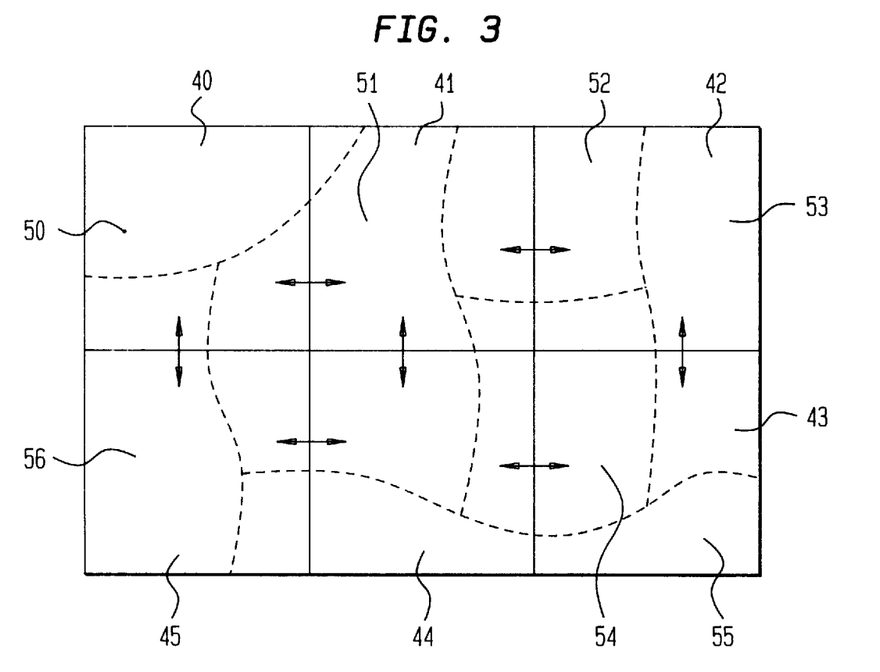
FIG. 3 is a graphical illustration of an image space wherein the solid lines show initial rectangular boundaries corresponding to the clusters of neurons or pixels in FIG. 2. The dotted lines show the boundaries of clusters demarcating homogeneous parts of an image during processing.

FIG. 3 shows both the representative initial state of cluster boundaries (solid lines forming rectangles 40–45) and possible subsequent or final states of cluster boundaries (dotted lines, forming shapes 50–56). In general, pixels within clusters will be more homogeneous in their intensities than pixels across clusters. A key aspect of the invention is captured in the formation and processing of clusters. As described in more detail below, a regularization value, $\lambda$, is assigned to each initial rectangular cluster. As a result of processing, the clusters may expand, contract, or disappear to maintain values of $\lambda$ in each cluster that allow the largest possible energy decent for pixels in each cluster. Throughout the process, each pixel remains connected only to neighboring pixels within specified radii, although this constraint need not be imposed in another embodiment of the invention. The final clustering approximately coincides with the homogeneity description of the image.

Figure 4:
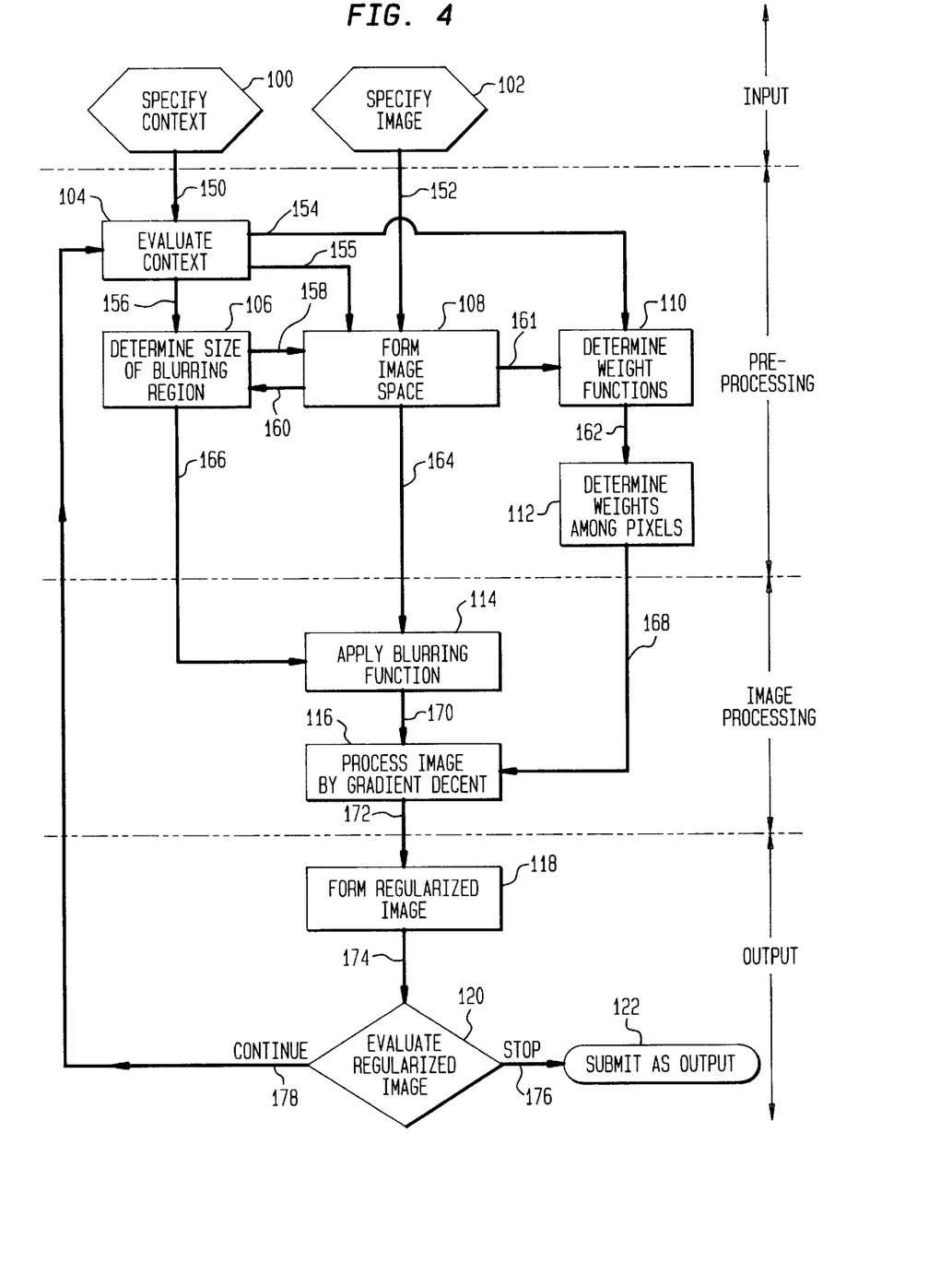
FIG. 4 is a functional block diagram of the major functional parts of an embodiment of the invention.

FIG. 4 shows in general terms the major elements of this embodiment of the invention. For ease of discussion only, FIG. 4 represents the invention as divided into four distinct parts or phases: the input-specification phase, consisting of blocks 100 and 102; the pre-processing phase, consisting of blocks 104, 106, 108, 110, and 112; the image processing phase, consisting of blocks 114 and 116; and the output phase, consisting of blocks 118, 120, and 122. The general purpose and interconnection of these blocks now will be described. More detailed descriptions are then provided in reference to FIG. 5 through FIG. 10, inclusive, which elaborate upon certain of the blocks shown in FIG. 4.

With respect to FIG. 4, block 100 represents the external specification of the environmental context of the image-regularization task. For example, it may be known that the image is of an underwater object, in which case, as suggested by lines 150, 154, and 156, the evaluation of environmental context represented by block 104 may result in a choice of "blurring region" sizes in block 106, explained below, and determination of templates describing weight functions in block 110, that take into account certain known characteristics of thermal interference and other distortion affects introduced by water. In addition, as shown by line 155 from block 104 to block 108, the context may affect the initial topography or mapping of the image space, as described with reference to FIG. 5. If the context is not known, or there is no correlation between the known context and the choice of blurring region sizes or weight templates, then they may be chosen arbitrarily or, alternatively, default or general-purpose blurring region sizes and weight templates may be specified. In addition, as is suggested by feedback line 178 from block 120 to block 104, the pre-processing, image-processing, and output phases may be repeated using different blurring region sizes, weight templates, and other factors described below if evaluation of the regularized image, as represented in block 120, suggests that less than optimal performance has been achieved. The iterative choice of blurring region sizes and templates may thus constitute a "calibration" process in which the system is tuned to a type of inhomogeneous distortion not previously encountered or adequately described. The blurring region sizes and weight templates that provide optimal image processing for this new type of distortion then may become available in the library for future applications in similar environmental contexts.

Also with respect to FIG. 4, block 102 represents the external specification of the raw, or unprocessed, image. The size and resolution of the raw image, i.e., the amount of information it contains, will be a factor determining the architecture of the "image space," as suggested by line 152 drawn from block 102 to block 108.

Also with respect to FIG. 4, block 106 represents the task of determining the size of the "blurring region." This term refers to a collection of adjacent pixels over which a blurring function will be imposed. If, for example, the blurring region is chosen to be an area defined by a square array of seven pixels by seven pixels, then the blurring function will be imposed on these 49 pixels. Similarly, the blurring function will be imposed on all other similar arrays of 49 pixels within the image space, with certain exceptions made, as specified in FIG. 9 with respect to the edges of the image space. The determination of the size of the blurring region may also depend in part on the environmental context, as previously noted and as suggested by line 156 from block 104 to block 106.

Also with respect to FIG. 4, block 108 represents the task of forming an image space upon which the raw image is mapped. As indicated by lines 152 and 158, the size and architecture of the image space may be influenced both by the characteristics of the raw image and the determination of the appropriate size for the blurring region. In addition, the size and architecture of the image space may influence the determination of the size of the blurring region, as indicated by line 160. The components of the task represented by block 108 are explained in greater detail below with reference to FIG. 5. Similarly, as indicated by lines 161 and 154, respectively, both the size and architecture of the image space, and the environmental context, may affect the determination of the weight functions, as represented in FIG. 4 by block 110 and described in greater detail below with reference to FIG. 7. The output of block 110, represented by line 162, enables the determination of weights among neighboring pixels as represented by block 112 and explained with reference to FIG. 8. Once established in this pre-processing phase, such weights remain constant during the image-processing, phase but may be changed if the feedback loop represented by line 178 is followed and a subsequent iteration of the pre-processing and image-processing phases is carried out.

Also with respect to FIG. 4, block 114 and lines 166 and 164 represent application of a blurring function to each pixel in the image space over the determined blurring region, such as is described in greater detail with reference to FIG. 9. Block 116 represents the processing of the pixels in the image space, as blurred as a consequence of the functions represented by block 114 and shown as an input to block 116 by line 170 and as influenced by the weights among pixels as represented by line 168 from block 112 to block 116. The iterative process of image regularization by gradient decent, as represented by block 116, is described in greater detail below with reference to FIG. 10. The result of this process, shown by line 172 and block 118, is the regularized image of the output phase of the invention. As shown by decisional block 120, block 122, and line 176, the resulting regularized image may be accepted as the final output of the invention for the instance of a particular raw image introduced in the input phase. Alternatively, as indicated by decisional block 120 and line 178, the regularized image may be evaluated as non-optimal, thus triggering a subsequent iteration of pre-processing, image processing, and output presentation based on a different set of blurring region size, weight templates, and other factors. This process is described in greater detail below with reference to FIG. 10.

Figure 5:
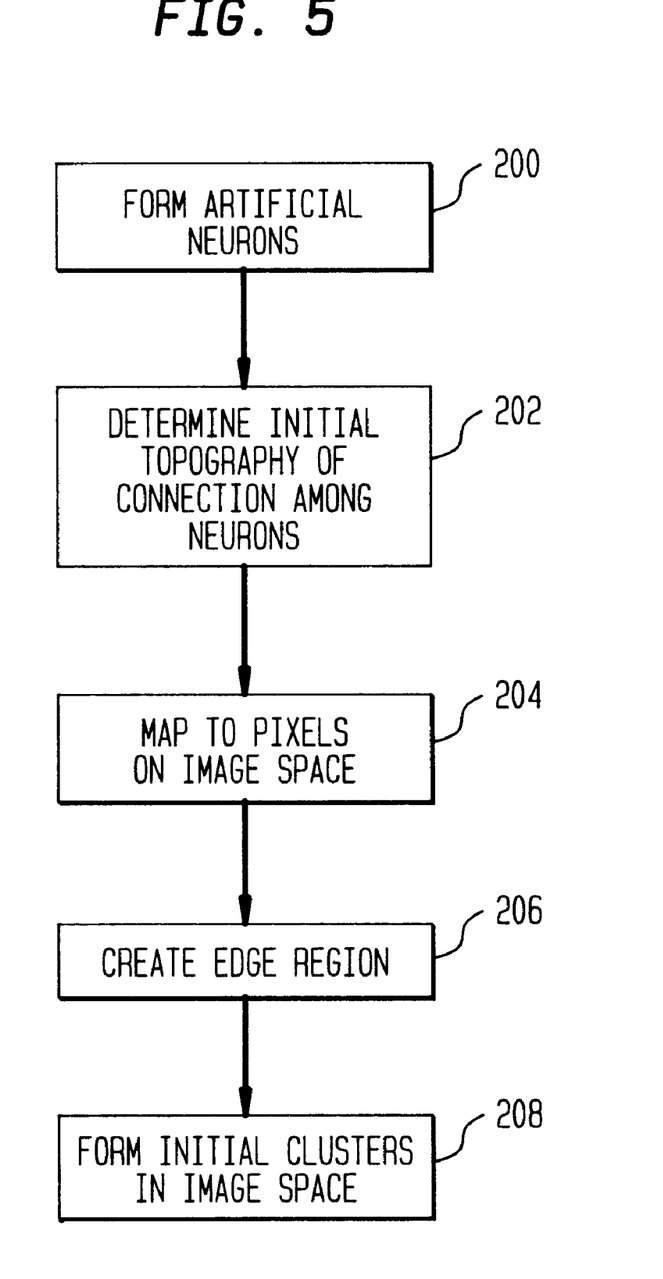
FIG. 5 is a functional block diagram of the major steps in the formation of the image space.

FIG. 5 specifies in greater detail the steps generally represented by block 108 of FIG. 4 relating to the formation of the image space. As indicated by block 200, a plurality of artificial neurons (pixels) is constructed and, as indicated by block 202, interconnected. The design of the individual artificial neurons is not critical, and any of a number of designs commonly used in neural network architectures will suffice. The essential requirements of the design are that each pixel must have a capability to receive a plurality of input signals from other pixels, and that these signals be capable of being operated upon in a manner such that the combined input results in an output related in a non-linear manner to the combined input. Also, the output of each pixel must have the capability to represent multiple values, such as would be representative of a grey scale. The interconnections among pixels also are capable of being implemented by many designs common in neural network architectures, such as the BSB network described previously. The present embodiment employs a Hopfield network architecture, the properties of which are well known and are described in "A Network of Networks Processing Model for Image Regularization," by Ling Guan, James A. Anderson, and Jeffrey P. Sutton, in *IEEE Transactions on Neural Networks*, Vol. 8, No. 1, pp. 169–174 (Jan. 1997), the contents of which are incorporated hereby by reference. One property of a Hopfield network is that the strength of the connections among artificial neurons (the "weights") are fixed for the duration of the gradient decent process and, unlike many other neural network architectures, are not incrementally adjusted. Rather, the weights encode, or are determined by, the memory states, or attractors, of the network. By asynchronously updating the neurons in a Hopfield network, by comparing the state of a neuron with the local field generated by the states of the other neurons, the entire network evolves toward a single memory state (with certain restrictions). This autoassociative property is not unique to the Hopfield network and is also true, for example, of the BSB network.

Also with respect to FIG. 5, block 204 represents a mapping module that maps the raw input image onto the network of connected pixels formed as a consequence of the functions represented in blocks 200 and 202. The mapping modules sets the initial output or "activity" state of each pixel in the image space to a value representing the grey scale value of the corresponding element of the raw input image. In addition, the image space includes an area extending outward a set number of pixels from all edges of the mapping of the raw input image onto the image space, as described in greater detail below. The resolution of the grey scale, that is, whether it encompasses 10 discrete levels of grey, 100 levels, or some other number of shades between white and black, may depend both on the characteristics of the input image, as illustrated by line 152 from block 102 to block 108 of FIG. 4, and on the environmental context, as illustrated by line 155 from block 104 to block 108 of FIG. 4. In the present embodiment, a grey scale ranging between the integers 0 to 255 is employed. The specification of this range may be changed if the result of the evaluation function represented by block 120 of FIG. 4 is such that the feedback line 178 from block 120 to block 104 is taken and the pre-processing, image-processing, and output phases are thus repeated. Hereafter, the grey-scale, or activity, level of a pixel may be referred to as its "intensity."

Also with respect to FIG. 5, block 206 represents the step of creating an edge region around the perimeter of that portion of the image space upon which the raw input image data has been mapped. In the present embodiment, for example, the raw input image may be mapped onto an image space represented by a square array of 256 by 256 pixels (for convenience, hereafter referred to as the "interior image space.") For ease of computation, this array of pixels may be transformed into a one dimensional array having 256 times 256, or 65,536 elements. An edge region is then created around this square array by adding a strip along each edge of the interior image space having a width determined by the number of additional pixels added, in this embodiment, 12. Thus, the complete image space, including the interior image space and the edge region, consists of an array of dimensions (256 plus 24) by (256 plus 24), or 280 by 280 pixels. The choice of the number of pixels determining the width of the edge region is not critical and may be based on the size of the interior image space, the size of the blurring regions, or the importance of regularizing information contained in the portions of the interior image space near the edge region. Such edge-region pixels are not subjected to the same image regularization processing that occurs for the remainder of the pixels in the interior image space during the image-processing phase of the invention. The reason is that the image boundaries prevent meaningful analysis and processing of the variance in the grey-scale, or pixel activity, states in the edge regions of the image space, as described in greater detail with respect to FIG. 9. Rather, the pixels in the regularized image represented by block 118 of FIG. 4 that correspond to the pixels in the edge regions are set to their initial values.

Also with respect to FIG. 5, block 208 represents the step of forming the initial clusters in the interior regions of the image space. A cluster represents a region of pixels in the interior region of the image space within which the value of the regularization parameter, $\lambda$, is the same. It is not necessary that the initial clusters be rectangular, but this shape is show in FIG. 3 for convenience only. Where the possibility of inhomogeneity is assumed, a cluster could be defined to be as small as one pixel or as large as the entire interior image space. The latter alternative obviates the assumption of possible inhomogeneity. The former alternative is mathematically sound, but would place an unnecessary computational burden on the invention and thus compromise its speed, which is one of its important attributes. The size of the initial clusters is thus set between these two extremes, depending on the environmental context and the nature of the raw input image. If the initial size of the clusters does not produce optimal results as evaluated in the step represented by block 120 of FIG. 4, such size can be adjusted in a subsequent iteration in accordance with feedback line 178 of FIG. 4.

In the present embodiment constituting an image space, including edge regions, of 280 by 280 pixels, the initial shape and size of the clusters is set in a three step process. First, the variance of intensity is determined within a four pixel radius of each pixel. That is, a measure of intensity variance across a 9 pixel by 9 pixel grid is assigned to the pixel in the middle of the grid. Second, the variance assigned to a pixel is mapped onto an integer. In the present embodiment, $\lambda$ is 1, 2 or 3. Third, a cluster is determined by a region where the $\lambda$ value for each pixel is the same. The size of the grid for determining the variance about a given pixel, the actual measure of variance and the mapping of the variance onto integers or other numbers or measures is also possible.

Figure 6:
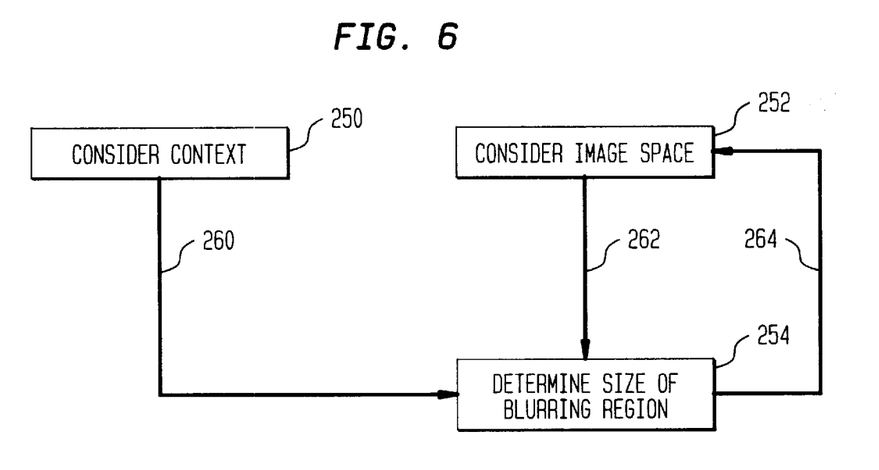
FIG. 6 is a functional block diagram of the major steps in the determination of the size of the blurring region.

FIG. 6 specifies in greater detail the steps carried out in block 106 of FIG. 4 with respect to the determination of the size of the blurring regions within the image space. In particular, blocks 250, 252, and 254, and lines 260, 262, and 264 of FIG. 6 represent the steps undertaken as a result of the processes represented by blocks 104, 106, and 108, and lines 156, 158, and 160 of FIG. 4. Specifically, the step of determining the size of the blurring region, as represented by block 254, takes into consideration the environmental context in that a large blurring region is appropriate fir contexts in which spatially large distortion affects are anticipated and a small blurring region is appropriate for contexts in which sudden and spatially limited distortion is anticipated. Moreover, the terms "large" and "small" as applied to blurring regions are relative to the size of the image space. In the present embodiment of an interior image space of 256 by 256 pixels, a blurring region consisting of a square array of 7 by 7 pixels is appropriate for a context in which the desired size is neither large nor small, but medium. Thus, a blurring region size equal approximately to 0.07 percent (49/65,536) of the size of the interior image space is appropriate.

The purpose of blurring is to prevent pixels from moving toward a stable, or attractor, state prematurely; that is, to move toward such a state based on a distortion factor that happens to locally satisfy the requirement of rapid gradient decent of an energy function. If no blurring is imposed, i.e., the size of the blurring region is set to zero or one pixel, then the invention still results in a regularized image that may be as accurate as if blurring is imposed, but the time needed to reach this result may be much longer than if blurring is imposed.

Figure 7:
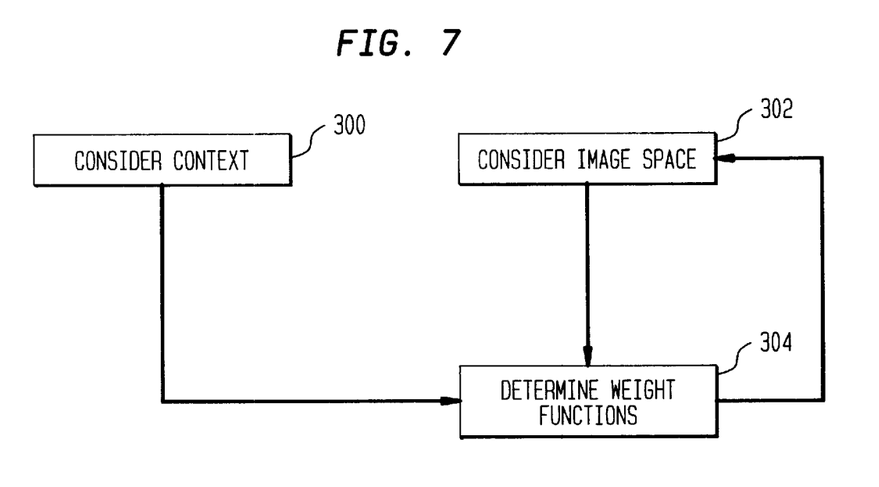
FIG. 7 is a functional block diagram of the major steps in the determination of the weight functions.

FIG. 7 specifies in greater detail the steps carried out in block 110 of FIG. 4 with respect to the determination of the weight functions among the pixels. In particular, blocks 300, 302, and 304 of FIG. 7 represent the steps undertaken as a result of the processes represented by blocks 104, 108 and 110, and lines 154 and 161 of FIG. 4. Specifically, the step of determining the weight functions, as represented by block 304, takes into consideration the environmental context in that a weight function encompassing relatively large weights is appropriate for contexts in which significantly inhomogeneous distortion does not occur. That is, the use of relatively large weights is indicated by a small local variance of pixel intensities. These relationships apply because larger weights tend to cluster homogeneous information together and allow the boundaries between clusters to be the focus of concentrated computation. Weight functions encompassing relatively small weights are indicative of greater variability in pixel activities. This may occur when pixels across clusters are interconnected.

In the embodiment of the invention described, weights are determined within a given radius of each pixel. Pixels outside a specified radius are not connected and hence their interconnected weights are trivially zero. Furthermore, in the limiting case of maximal variance associated with random intensities within the specified radius, there would be no significant correlations among the pixels and the weights would be zero. The relationships between the magnitude and sign of weight values and the variability in pixel intensities therefore encompass several possibilities, including those beyond the relationships described in the present embodiment. The critical feature is that weights function to help demarcate how pixels cluster, which is important for identifying edges and discontinuities requiring image clarification.

In the present embodiment, eighteen weight templates constitute the repertoire of weight functions that are applied to each pixel based, among other factors, on the size of the blurring region in which it resides, which size in turn is based on the variance among pixel intensities in the blurring region. In the present embodiment, the weights are fixed during processing, although this is not necessary and the weights could be updated during the processing. Additional factors affect the decision of which weight template to apply.

For example, the weight templates depend upon the extent to which pixels interact with each other. In the current embodiment, weights are determined in blocks of 100 pixels by 100 pixels. The effective weight on a given pixel is thereby determined by the 100 pixel by 100 pixel region centered about that pixel. Moreover, the weights for each pixel in the image may be partially derived by contributions of blurring in the edge regions.

Figure 8:
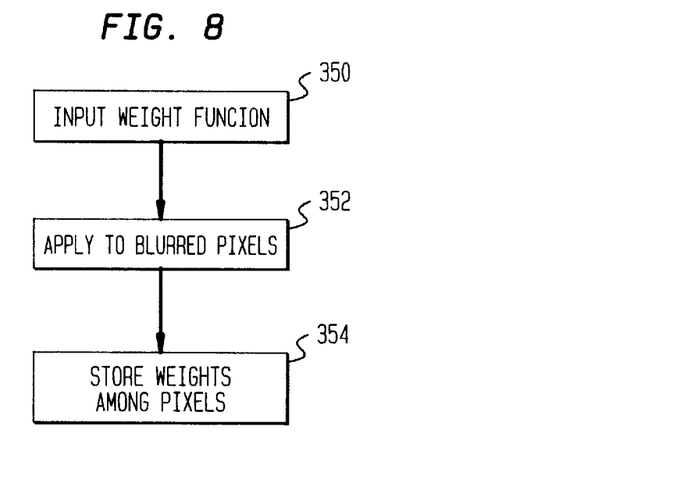
FIG. 8 is a functional block diagram of the major steps in the determination of the weights among pixels.

FIG. 8 specifies in greater detail the steps carried out in block 112 of FIG. 4 with respect to the determination of weights among pixels in the image space. In particular, blocks 350, 352, and 354 of FIG. 8 represents a weight-assigning module that, as represented by block 350, utilizes the weight templates to set the weights for each pixel in the image space. The weight-assigning module then applies these weight templates to each pixel, as represented by block 352 and stores these weights, as represented by block 354, so that the strengths of all inter-pixel connections are fixed during the image-processing phase. Although the weights in this embodiment are not modified during the image-processing phase, they may be changed in later iterations if the evaluation of the regularized image represented by block 120 of FIG. 4 indicates less than optimal performance. The bases for such subsequent changes may be changes in the assessment of the environmental context or in the variance among pixels in the blurring region to which a weight template is applied.

Figure 9:
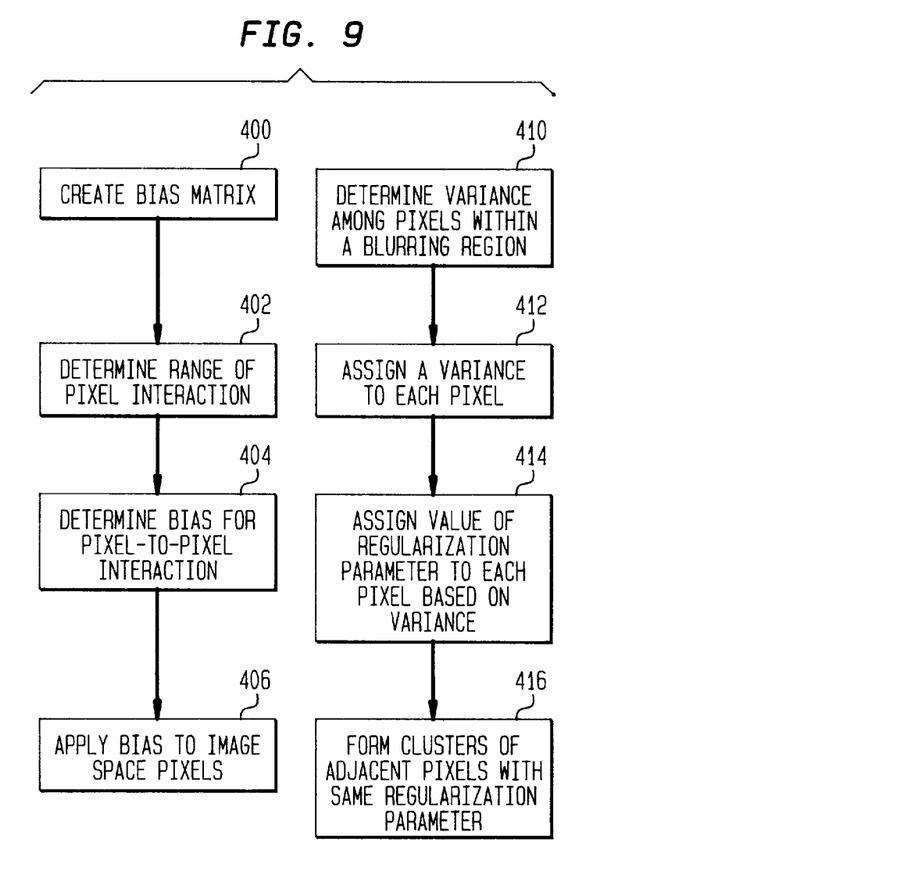
FIG. 9 is a functional block diagram of the major steps in the application of the blurring function to pixels.

FIG. 9 specifies in greater detail the steps carried out in block 114 of FIG. 4 with respect to application of the blurring function. In particular, blocks 400, 402, 404, and 406 of FIG. 9 represent what may be called the first function of block 114, whereas blocks 410, 412 414, and 416 of FIG. 9 represent the second function of block 114. These functions constitute the first steps in the image-processing phase of the invention. Specifically, the first function is carried out by a blurring module that creates a repertoire of blurring functions, referred to as a bias matrix, in this embodiment implemented by utilizing a point-spread-function such as a Gaussian spread function, as represented by block 400. As shown in block 402, the blurring module then determines the range of pixel interaction over which the blurring functions in the bias matrix are to be applied based on the size of the blurring regions, as discussed in reference to FIG. 6 above. As represented by block 404, the blurring module determines the particular blurring function to be applied within each blurring region and, as shown in block 406, the blurring module applies the blurring value determined by each such function to each pixel in the image space.

The second function represented by block 114 of FIG. 4 and shown in blocks 410, 412, 414, and 416 of FIG. 9 consists first, as represented by block 410, of a variance-measuring module that determines the variance among the activity states, or grey-scale levels, of the pixels in each of the blurring regions. The variance-measuring modules initially determines these variances based on the un-blurred intensities of the initial mapping of the raw input image onto the image space. As represented by block 412, a regularization module then assigns a value for the variance to each pixel in each blurring region. Block 414 indicates that the regularization module maps a value of $\lambda$ onto each pixel, depending on its variance. As represented in block 416, a cluster-adjusting module groups together adjacent pixels with the same values of $\lambda$ to form (or re-draw) clusters. It is an important aspect of the invention that such application of $\lambda$, together with the use of variances to generate weight functions that introduce smoothing due to application of the blurring function, impose mesoscopic, or intermediate level, homogeneity across the image space.

It is not essential that there be a large range of values for $\lambda$, and it is sufficient, but not necessary, to assign a relatively small number of integer values to $\lambda$ based on the value of the variance computed. For example, in this embodiment, it is sufficient to assign a value of 3 to the $\lambda$ in a blurring region if the variance in that region is between 51 and 100, a value of 2 if the variance is between 101 and 200, and a value of 1 if the variance is greater than 200.

Figure 10:
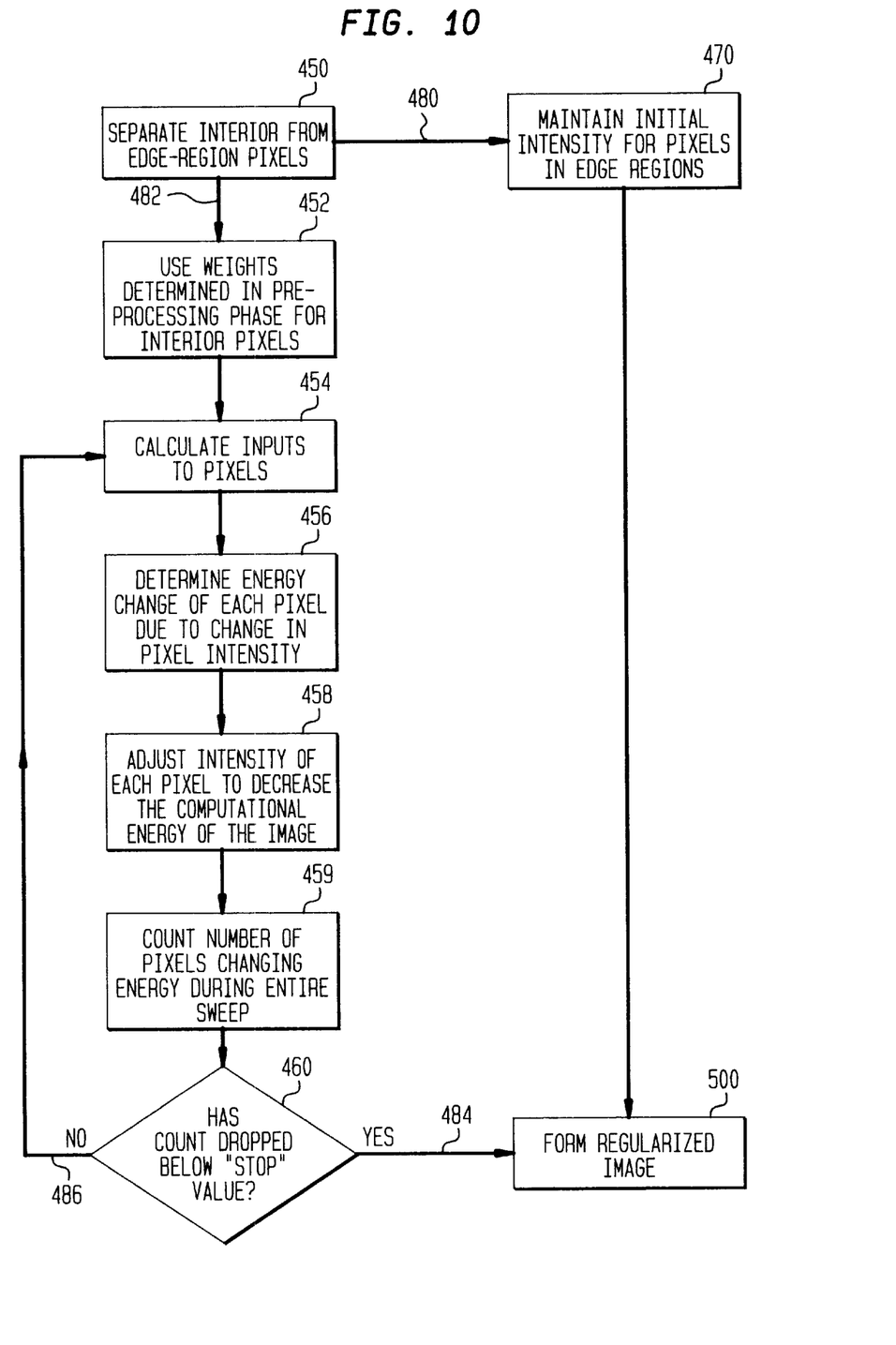
FIG. 10 is a functional block diagram of the major steps in the processing of the image by gradient decent.

FIG. 10 specifies in greater detail the steps carried out in block 116 of FIG. 4 with respect to processing of the internal image space by gradient decent and block 118 of FIG. 4 with respect to forming the regularized (i.e., de-blurred) image. As indicated by block 450 of FIG. 10, the pixels in the edge regions first are identified and they are excluded from processing by gradient decent. Rather, as indicated by line 480 and blocks 470 and 500, the initial grey scale levels or activity states of edge-region pixels are maintained and utilized without processing in the formation of the regularized image in this embodiment. This choice of processing of the edge region is not crucial, and many other mechanisms could be employed to select or process edge-image pixels in other embodiments of the invention. In contrast, as indicated by line 482 and block 452, each pixel in the interior image space is processed.

Also with respect to FIG. 10, and as indicated by block 452, the weights among pixels, having already been determined during the pre-processing phase, are not changed during processing by gradient decent in this embodiment. The weights may be changed if the result of the decisional block 120 of FIG. 4 is to repeat the pre-processing phase. The invention, moreover, encompasses the alternative of reassigning weight functions during the processing by gradient decent by means of recalculating pixel-intensity variances resulting from the previous iteration of gradient-decent energy minimization. In the initial iteration, the inputs to each pixel will have been determined also during the pre-processing phase as a consequence of the formation of the image space and thus the intensity of each pixel, as indicated by block 108 of FIG. 4, and of the application of the blurring function to each pixel, as indicated by block 114 of FIG. 4. Consequently, the variance of each pixel and the associated value of $\lambda$ for that variance have also been determined for each pixel prior to processing in accordance with block 454 of FIG. 10.

Also with respect to FIG. 10, blocks 454, 456, and 458 represent an intensity-adjusting module. As indicated by block 454 of FIG. 10, the intensity-adjusting module calculates the initial inputs to each pixel and then, as indicated by block 456, the intensity-adjusting module uses this information to determine the energy change associated with the change in pixel intensity. Specifically, block 456 shows that the intensity-adjusting module applies the weights for each input of the subject pixel to the outputs of the pixels supplying such input, combining the resulting weighted input in a manner determined by the design of the subject pixel, calculates the resulting intensity of the subject pixel, and calculates the change in energy associated with any change in such intensity that may result compared with the intensity of the subject pixel prior to the operation represented in block 456. The intensity-adjusting module determines a quantity, which may be called theta, to represent the contribution of the pixel to the computational energy of the image. In artificial neural networks, theta is a measure of the local potential field multiplied by, or convoluted with, the pixel intensity or neuron activity. As indicated by block 458, if theta is positive, then the intensity-adjusting module adjusts the pixel intensity by a small amount in order to decrease the contribution to the computational energy of the image. This adjustment to the pixel intensity may be positive or negative (i.e., in this embodiment, made closer to 255 or closer to 0, respectively) and may be more than a single unit. For example, a pixel may be adjusted from a value of 137 to a value of 145. Pixels already at 0 or 255 that would otherwise be decreased or increased, respectively, in intensity based on their theta values are not adjusted in this embodiment. If theta is less than zero, then the pixel is already making a negative contribution to the computational energy of the image and therefore no adjustment is made to that pixel's intensity. The processing represented by blocks 454, 456, and 458, as just described is repeated in this embodiment for each pixel.

Also with respect to FIG. 10, block 459 represents an intensity-change-measuring module that counts the total number of pixels that have changed intensity during the sweep through all of the pixels as just described with respect to blocks 454, 456, and 458. When the number of such changes drops below a particular "stop" value, which is 100 in this embodiment, the resulting image space is accepted as the regularized image, as indicated by block 460, line 484, and block 500. If the number of pixels that have changed intensity is 100 or greater in this embodiment, the process represented by blocks 454, 456, 458, 459, and 460 is repeated, as indicated by block 460 and line 486. It is not important how the counting represented by block 459 is accomplished; for example, a random sample of pixels could be made to determine if the number of changes of intensity has fallen below a chosen level rather than counting each pixel. Moreover, the value chosen for the "stop" value is not critical within a reasonable range.

The regularized image represented by block 118 of FIG. 4 or block 500 of FIG. 10 may be accepted as the final product of the invention, as indicated by block 120 and line 176 of FIG. 4. Alternatively, another cycle of the pre-processing, image-processing, and output phases may be initiated, as indicated by block 120 and line 178 of FIG. 4. The evaluation represented by block 120 may be made by the software or hardware embodiment based on a plurality of criteria, such as, for example, determining the root mean square difference in pixel intensities between a final regularized image and a know input image. The evaluation may also be made by a human operator, or the process may be repeated for an arbitrary number of iterations in order to compare regularized images acceptable under the criteria represented by block 460 of FIG. 10. In this embodiment, the regularized image represented by block 500 of FIG. 10 is taken as the final regularized image.

An exemplary computer software program that implements a similar embodiment of the invention as is described in FIGS. 4 through 10 is listed in Appendix A. The program is written in the "C" programming language, but the invention is not so limited, as it could be written in any programming language. The key blocks in FIGS. 4 though 10 are highlighted in the margins of Appendix A.

Figure 11:
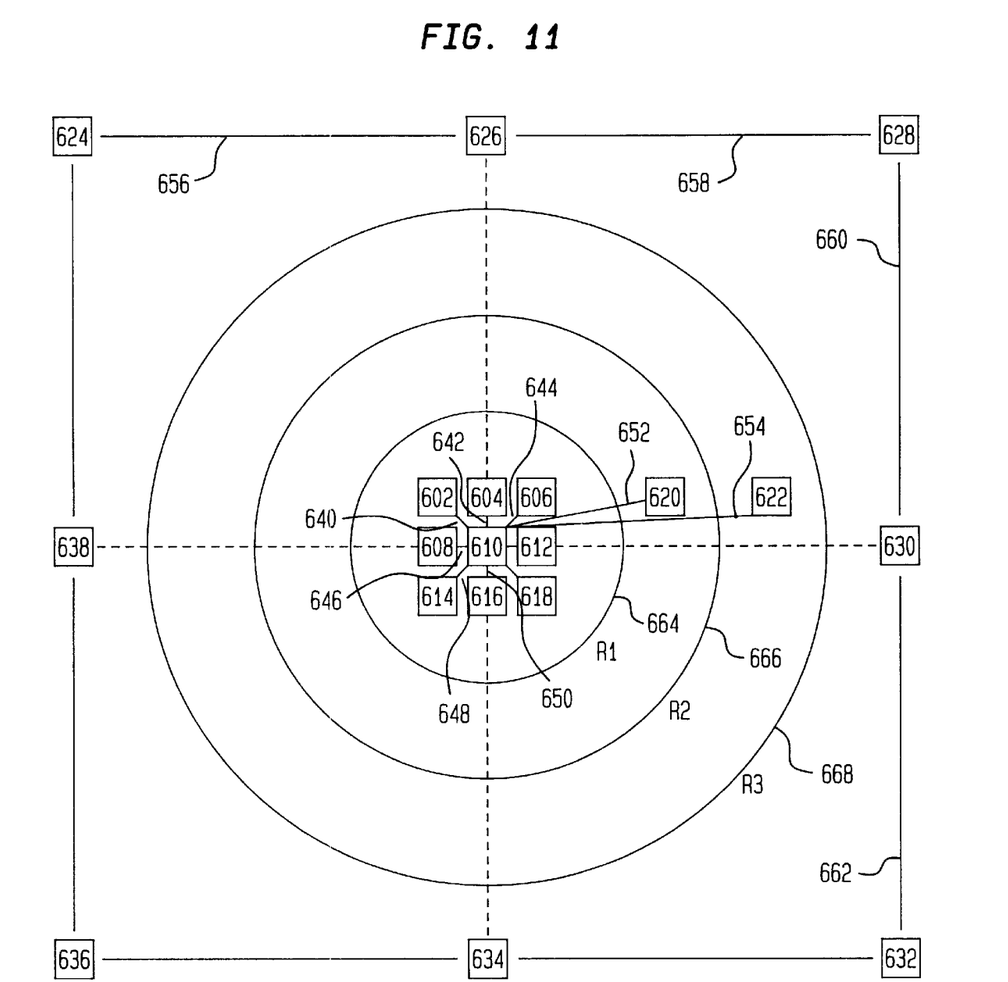
FIG. 11 is a block diagram of an exemplary hardware implementation of the invention.

FIG. 11 is a block diagram of an exemplary hardware implementation of the invention. As shown, the exemplary hardware implementation consists of an array of processing units wherein each unit represents an analog silicon neuron, chip, photocell receptor, photodiode or other similar device. FIG. 11 shows a two dimensional square array of units, with representative units labeled 602 to 638. Units 624 to 638 are representative of boundary units. Lines 656, 658, 660 and 662 represent the boundary of the array, which need not be a square array. The signal output from a typical unit is determined from the input image, which is mapped onto the array, and by regularization effects. Each unit in the array may correspond to one or more pixels of the input image. The regularization effects occur over different ranges. For illustrative purposes, three ranges are shown in FIG. 11.

Range R1, demarcated by line 664, encompasses units 602 to 618. Sample connections between units within R1 are shown. Line 640 connects units 602 and 610, line 642 connects units 604 and 610, line 644 connects units 606 and 610, line 646 connects units 608 and 610, line 648 connects units 610 and 614, line 650 connects units 610 and 616. R1 may be used as the radius for determining the blur size to be used in the regularization process. For example, R1 may correspond to the distance in the point spread function blurring in the software embodiment of the invention.

A larger radius, R2, as shown by line 666, encompasses the units within R1 as well as units such as 620 in FIG. 11. A representative connection between units 610 and 620 is given by line 652. R2 might correspond to a radius for determining the variance assigned to the processes in unit 610. The radius R2 used in determining the variance does not have to be greater than the radius R1 used to determine the point spread blurring.

The effective weights assigned to all connections between unit 610, for example, and all other units in the array can be constrained by a radius, R3, labeled by the line 668. For example, units beyond, or further away, than R3 relative to unit 610 would have no effect on unit 610. In this example, the weight between units 610 and 624 would be zero.

The radii R1, R2 and R3 are illustrative of how to demarcate boundaries in the regularization process. Boundaries can also be established by demarcating clusters of units based on the homogeneity of their signal intensities. These boundaries would change as regularization proceeded, as in the embodiment of the invention. The dynamics of the clusters allow the hardware to function as an adaptable computing architecture since the clusters encode intermediate levels of organization which emerge on a device consisting of self-replicating units or devices.

Having now described the preferred embodiment of the invention, it should be apparent to those skilled in the art that the foregoing is illustrative only and not limiting, having been presented by way of example only. Numerous other embodiments and modifications thereof are contemplated as falling within the scope of the present invention as defined by appended claims and equivalents thereto.

What is claimed is:

1. A network of computational units comprising:
   a first pixel having processing capabilities and the capability of assuming an activity state;
   a first cluster including a network of a plurality of interconnected pixels including the first pixel, the first cluster also having processing capabilities;

an image space including a network of interconnected clusters of interconnected pixels including the first cluster, the image space also having processing capabilities;

a mapping module that maps an input image upon the image space;

a variance-measuring module that determines a variance of activity states of a plurality of pixels around the first pixel;

a regularization module that assigns a regularization parameter to the first pixel determined by the variance; and a cluster-adjusting module that changes the shape of the first cluster to include only a plurality of interconnected pixels, each pixel having a similar regularization parameter assigned to it.

2. The network of computational units of claim 1 further including a blurring module that applies a blurring function to the activity state of the first pixel.

3. The network of computational units of claim 2 further including a weight-assigning module that assigns a weight function to the first pixel as determined by the regularization parameter and the blurring function.

4. The network of computational units of claim 3 further including an intensity-adjusting module that adjusts the activity state of the first pixel.

5. The network of computational units of claim 1 wherein connections exist between both spatially local and distant pixels.

6. The network of computational units of claim 1 wherein connections exist between both spatially local and distant clusters.

7. The network of computational units of claim 1 wherein the image space includes an edge region increasing by at least one pixel the space upon which an input image has been mapped.

8. The network of computational units of claim 1 wherein a plurality of clusters comprising pluralities of pixels is formed based on commonality of regularization parameters.

9. The network of computational units of claim 3 wherein the weight-assigning module selects a weight function from a plurality of weight functions as determined by anticipated characteristics of distortion imposed on the input image.

10. The network of computational units of claim 9 wherein relatively large weights are related to anticipated small local variances and relatively small weights are related to anticipated large local variances.

11. The network of computational units of claim 4 wherein the intensity-adjusting module adjusts the activity state of the first pixel by the process of gradient energy decent.

12. The network of computational units of claim 4 wherein the activity state of the first pixel continues to be adjusted until an intensity-change-measuring module determines that the activity state of the first pixel is not changed by application of the weight function.

13. The network of computational units of claim 4 wherein the activity state of the first pixel continues to be adjusted until an intensity-change-measuring module determines that the activity state of the first pixel and the activity state of at least one other pixel of the plurality of pixels is not changed by application of the weight function.

14. A network of computational units comprising:

a first pixel having processing capabilities and the capability of assuming an activity state;

a first cluster including a network of a plurality of interconnected pixels including the first pixel, the first cluster also having processing capabilities;

an image space including a network of interconnected clusters of interconnected pixels including the first cluster, the image space also having processing capabilities;

means for mapping an input image upon the image space;

means for determining a variance of activity states of a plurality of pixels around the first pixel;

means for assigning a regularization parameter to the first pixel determined by the variance; and means for changing the shape of the first cluster to include only a plurality of interconnected pixels, each pixel having a similar regularization parameter assigned to it.

15. The network of computational units of claim 14 further including:

means for applying a blurring function to the activity state of the first pixel;

means for assigning to the first pixel a weight function determined by the regularization parameter and the blurring function;

means for adjusting the activity state of the first pixel;

means for selecting the weight function from a plurality of weight functions determined by anticipated characteristics of distortion imposed on the input image; and means for continuing to adjust the activity state of the first pixel until the activity state of the first pixel and the activity state of at least one other pixel of the plurality of pixels is no changed by application of the weight function.

16. A method for regularizing an input image distorted by noise comprising the steps of:

forming a first pixel having processing capabilities and capable of having an activity state;

forming a first cluster including a network of a plurality of interconnected pixels including the first pixel, the cluster also having processing capabilities;

forming an image space including a network of interconnected clusters of interconnected pixels including the first cluster, the image space also having processing capabilities;

mapping an input image upon the image space;

determining a variance of activity states of a plurality of pixels around the first pixel;

assigning a regularization parameter to the first pixel determined by the variance; and changing a shape of the first cluster to include only a plurality of interconnected pixels each having a similar regularization parameter assigned to it.

17. The method of claim 16 further comprising the steps of:

determining a blurring function;

determining a size of a blurring region over which the blurring function can be applied to the activity state of the first pixel;

applying the blurring function to the activity state of the first pixel;

determining a plurality of weight functions;

assigning to the first pixel a weight function determined by the regularization parameter and the blurring function;

calculating the weighted inputs to the first pixel;

changing the activity state of the first pixel based on the weighted inputs;

determining a computational energy change of the first pixel due to the change in the activity state;

adjusting the activity state of the first pixel to decrease the computational energy; and repeating the foregoing steps unless adjusting the activity state of the first pixel does not decrease the computational energy.

18. The method of claim 17 wherein the last step consists of repeating the foregoing steps unless adjusting the activity state of the first pixel and at least one other pixel does not decrease the computational energy.

19. The method of claim 17 or claim 18 further comprising the step of:

specifying the context in which the input image was distorted.

20. The method of claim 17 or claim 18 further comprising the step of:

adding an edge region consisting of at least one pixel to the image space.

* * * * *